United States Patent
Thieding

(10) Patent No.: US 9,670,633 B1
(45) Date of Patent: Jun. 6, 2017

(54) FLOOD BARRIER SYSTEM FOR BUILDINGS AND UTILITY INSTALLATIONS

(71) Applicant: Jeffrey J. Thieding, Loganville, WI (US)

(72) Inventor: Jeffrey J. Thieding, Loganville, WI (US)

(73) Assignee: T3 INVESTMENTS, LLC, Loganville, WI (US)

( * ) Notice: Subject to any disclaimer, the term of this patent is extended or adjusted under 35 U.S.C. 154(b) by 0 days.

(21) Appl. No.: 15/059,503

(22) Filed: Mar. 3, 2016

(51) Int. Cl.
  *E02B 3/00* (2006.01)
  *E04H 9/14* (2006.01)
  *E02B 3/10* (2006.01)

(52) U.S. Cl.
  CPC ............. *E02B 3/106* (2013.01); *E04H 9/145* (2013.01)

(58) Field of Classification Search
  CPC ... E02B 3/10; E02B 3/106; E02B 7/02; E02B 7/08; E04H 9/145
  See application file for complete search history.

(56) References Cited

U.S. PATENT DOCUMENTS

| | | | | |
|---|---|---|---|---|
| 2,202,662 A * | 5/1940 | Knight | ...................... | E02B 3/102 405/90 |
| 3,975,915 A | 8/1976 | Haw | | |
| 4,375,929 A | 3/1983 | Clark | | |
| 4,692,060 A * | 9/1987 | Jackson, III | ............ | E02B 3/108 256/13 |
| 5,118,217 A * | 6/1992 | Younes | ................... | E02B 3/102 405/107 |
| 5,470,177 A | 11/1995 | Hughes | | |
| 5,645,373 A | 7/1997 | Jenkins | | |
| 5,993,113 A | 11/1999 | Darling | | |
| 6,029,405 A | 2/2000 | Wood | | |
| 6,079,904 A | 6/2000 | Trisl | | |
| 6,354,762 B1 | 3/2002 | Muramatsu | | |
| 6,413,014 B1 * | 7/2002 | Melin | ...................... | E02B 3/108 405/107 |
| 6,450,733 B1 * | 9/2002 | Krill | ....................... | E02B 3/102 405/107 |
| 6,884,002 B1 * | 4/2005 | Fuller | ....................... | E02B 7/22 405/114 |
| 7,121,764 B2 | 10/2006 | Rørheim | | |
| 7,364,385 B1 | 4/2008 | Luke | | |
| 7,552,565 B1 | 6/2009 | Smith | | |
| 7,690,865 B1 * | 4/2010 | Stewart | ................... | E04H 9/145 405/114 |

(Continued)

OTHER PUBLICATIONS

Aquadam Flood Control, http://www.aquafamec.com, Apr. 1, 2014.

(Continued)

*Primary Examiner* — Benjamin Fiorello
(74) *Attorney, Agent, or Firm* — Charles S. Sara; DeWitt Ross & Stevens, S.C.

(57) ABSTRACT

A protective flood barrier to protect a building and/or utility installation from flood waters that includes a continuous, water-tight base foundation surrounding and positioned in close proximity of the building; a plurality of removable structural stands adapted for placement on the base foundation wherein the structural stands have a proximal end situated adjacent the base foundation and a distal end; a sealing liner for placement on the structural stand; and a base seal for sealing the sealing liner to the base foundation.

17 Claims, 10 Drawing Sheets

(56) References Cited

U.S. PATENT DOCUMENTS

| | | | |
|---|---|---|---|
| 7,976,240 B2 | 7/2011 | Mun | |
| 8,001,735 B2 | 8/2011 | Fisher | |
| 8,074,406 B2* | 12/2011 | Ksenych | B65D 90/24 |
| | | | 4/506 |
| 8,313,265 B2 | 11/2012 | Taylor | |
| 8,858,120 B2 | 10/2014 | Allen et al. | |
| 8,864,411 B2 | 10/2014 | Taylor | |
| 9,004,815 B2 | 4/2015 | Taylor | |
| 9,181,026 B2* | 11/2015 | Laing | E04H 4/0056 |
| 2004/0098937 A1 | 5/2004 | Blake et al. | |
| 2014/0109482 A1 | 4/2014 | Rakhmanin | |
| 2015/0151906 A1* | 6/2015 | Shaw | B65D 90/24 |
| | | | 141/88 |

OTHER PUBLICATIONS

Building Design + Construction, Removable flood prevention system installed in one of New York City's largest office buildings, http://www.cdcnetwork.com, Mar. 31, 2014.

Hitachi Zosen Corp., Flood-prevention system eliminates need for electricity, human operators, http://ajw.asahi.com, May 21, 2013.

Presray Flood Gates & Flood Barriers, http://www.presray.com, Apr. 1, 2014.

Tiger Dam System, Tiger Dams the first line of defense, http://usfloodcontrol.com, Apr. 1, 2014.

Watershed Innovations, HydraBarrier®—The Eco-friendly Sandbag Alternative, http://www.hydrabarrier.com, Apr. 1, 2014.

* cited by examiner

FLOOD BARRIER SYSTEM FOR BUILDINGS AND UTILITY INSTALLATIONS

FIELD OF THE INVENTION

This invention is directed to a flood protection system or flood barrier, and more particularly to a removable flood barrier system, for commercial buildings, agricultural buildings & storage facilities, transformer stations, homes, lift stations, sanitation/sanitary facilities, etc.

BACKGROUND

Flooding in low-lying areas has long been a problem that results in extensive damage and destruction of buildings and utility installations, often costing in the tens of millions of dollars per location/occurrence. As a result, there have been many attempts to construct both permanent and temporary flood containment devices from the stacking of sandbags to permanent retaining walls. The following patents and patent publications, all of which are incorporated herein by reference, relate to examples of retaining walls:

| Pat./Publication No. | Inventor | Issue/Publication Date |
| --- | --- | --- |
| 5,645,373 | Jenkins | Jul. 8, 1997 |
| 5,993,113 | Darling | Nov. 30, 1999 |
| 6,029,405 | Wood | Feb. 29, 2000 |
| 7,552,565 | Smith | Jun. 30, 2009 |
| 7,976,240 | Mun | Jul. 12, 2011 |
| 8,001,735 | Fisher | Aug. 23, 2011 |
| 2014/0109482 | Rakhmanin | Apr. 24, 2014 |
| 3,975,915 | Haw | Aug. 24, 1976 |
| 5,470,177 | Hughes | Nov. 28, 1995 |
| 6,079,904 | Trisl | Jun. 27, 2000 |
| 6,354,762 | Muramatsu | Mar. 12, 2002 |
| 8,313,265 | Taylor | Nov. 20, 2013 |
| 8,858,120 | Allen et al. | Oct. 14, 2014 |
| 9,004,815 | Taylor | Apr. 14, 2015 |
| 2004/0098937 | Blake et al. | May 27, 2004 |

While there have been many attempts to solve the flooding issue, there still remains a need for a safe and effective flood barrier, which is easy to install and maintain.

SUMMARY OF THE INVENTION

The present invention is directed to a protective flood barrier to protect property (both buildings and utility installations) from flood waters, comprising a continuous, watertight base foundation surrounding and positioned in close proximity of the building and/or protected area; a plurality of removable structural stands adapted for placement on the base foundation wherein the structural stands have a proximal end situated adjacent the base foundation and a distal end; a sealing liner for placement on the structural stand; and a base seal for sealing the liner to the base foundation.

The present invention is further directed to a method of providing a flood barrier system to protect a specific building/area from flood waters, comprising providing a continuous, water-tight base foundation surrounding and positioned in close proximity of the building/protected area; providing a plurality of removable structural stands on the base foundation wherein the structural stands have a proximal end situated adjacent the base foundation and a distal end, wherein the plurality of structural stands further have an exterior side and an interior side; wrapping a flexible sealing liner around the exterior side of the plurality of structural stands, wherein the flexible sealing liner(s) has a leading edge and a trailing edge which meet; and placing a base seal over the leading edge and the trailing edge of the flexible sealing liner(s) for sealing the liner to the base foundation.

The advantages to the present system are that it is lightweight, simple to install, does not require intensive labor (2-3 people compared to 20-30 for sandbagging) and no heavy equipment required for deployment and disassembly. It takes only small readily available hand tools to employ and fasten the system and easy storage of components (i.e., all components stored efficiently on trailers).

The objects and advantages of the invention will appear more fully from the following detailed description of the preferred embodiment of the invention made in conjunction with the accompanying drawings.

DETAILED DESCRIPTION OF THE INVENTION

The present invention is directed to a flood barrier system capable of installation with little advance notice of an impending flood situation. Normally, locations with the propensity for a flood, or a flood zone, will have at least 1 to 2 days' notice in order to prepare for the flood.

Figure 1:
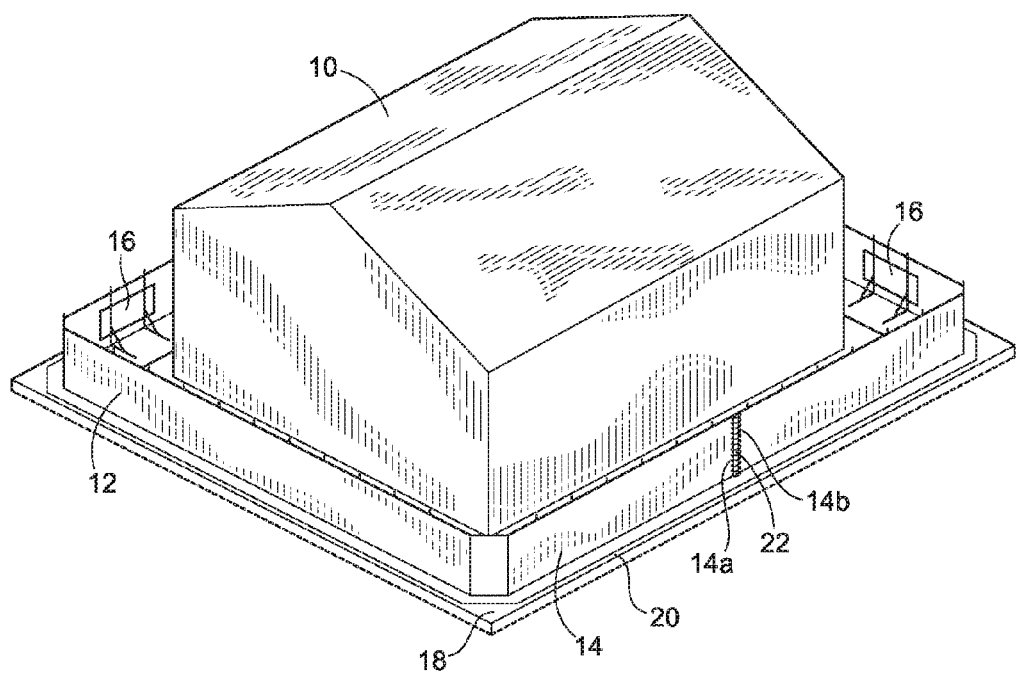
FIG. 1 is a perspective view of a flood barrier system of the present invention.
Figure 2:
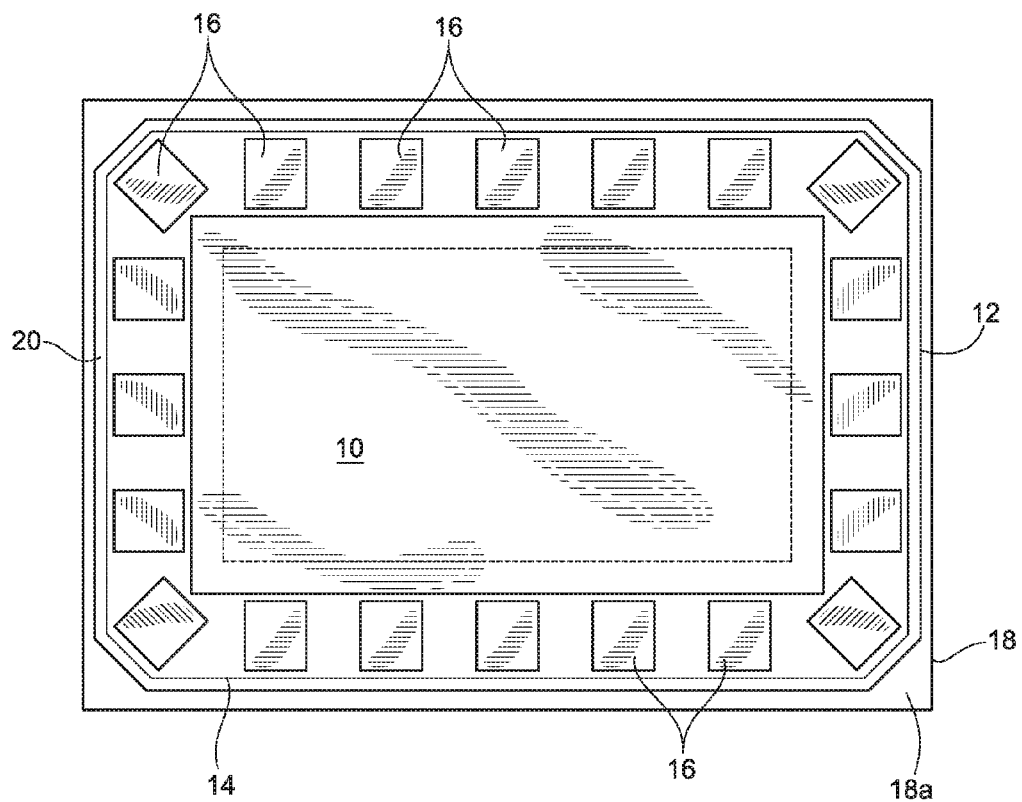
FIG. 2 is a top plan view of the system of FIG. 1.

Turning to FIGS. 1 and 2, there is illustrated a building 10 protected by a flood barrier system 12 in close proximity to and surrounding the building 10. The flood barrier system 12 includes the following component parts: a liner 14, a series of structural stands 16 in close proximity to each other and extending around the building 10, a watertight base foundation 18, generally made of concrete, a base seal 20 and a vertical liner seal 22.

As illustrated in FIG. 1, the liner 14 rises to a certain height to prevent the flood waters from reaching the building 10. The height of the liner 14 and the flood barrier system 12 itself can be dependent upon the floodwater conditions in the geographic location or the needs of the owner of the property. Typically, the liner 14 height will range from three feet to six feet with a height of five feet being preferred.

Figure 3:
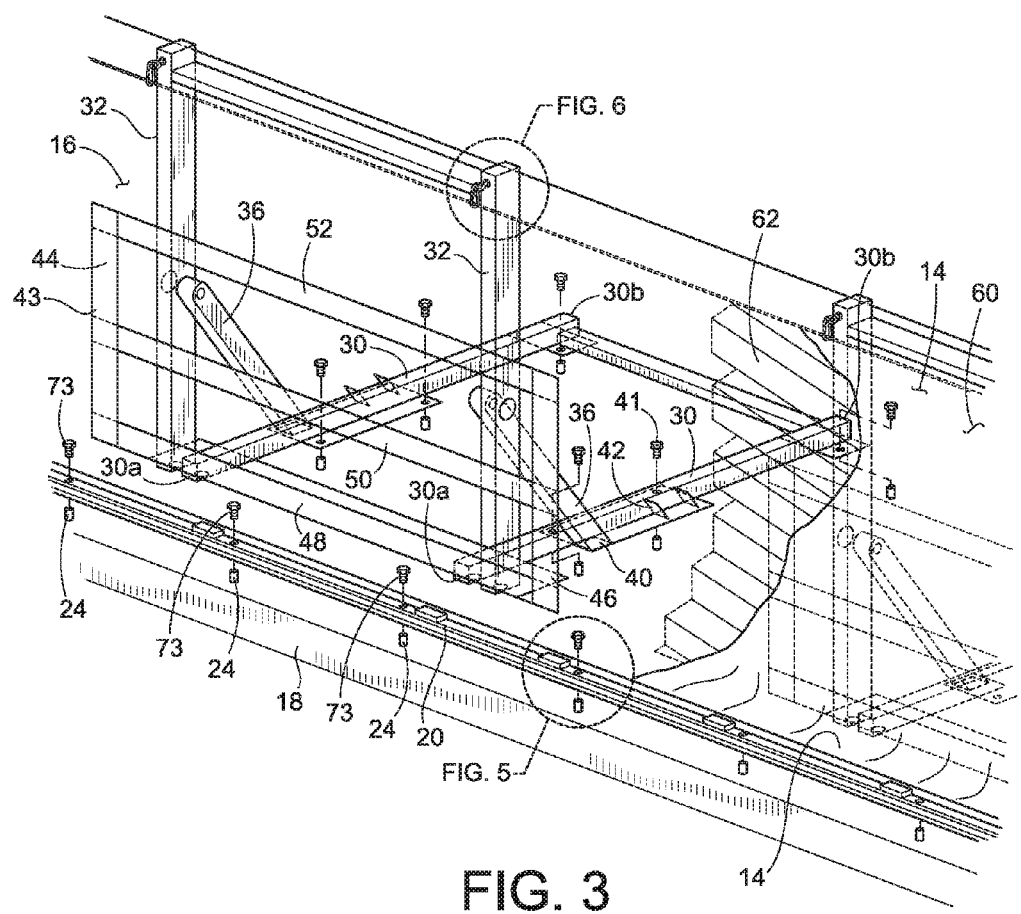
FIG. 3 is a perspective view of the structural support system of the present invention.
Figure 4:
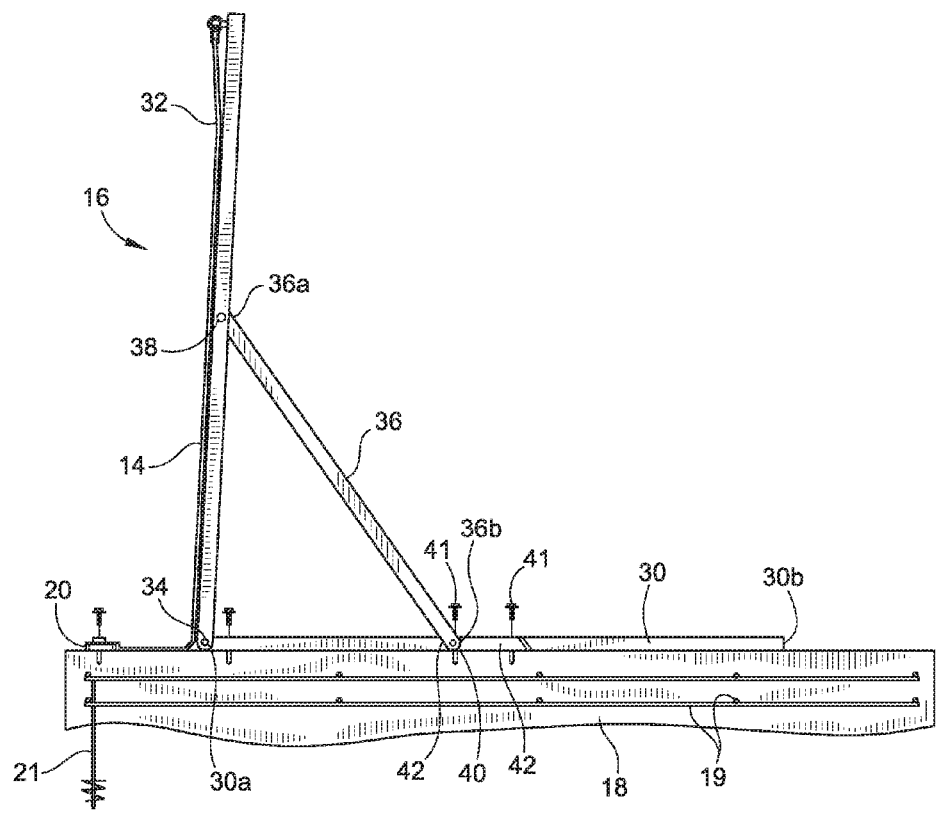
FIG. 4 is a side plan view of the structural support system illustrated in FIG. 3.

Base 18:

The base 18 is preferably a continuous watertight base foundation which surrounds the building 10. The base 18 is made of reinforced, anchored concrete. The base 18 provides an apron around the building 10 and is preferably situated a minimum of one (1) foot from the building 10, illustrated by the dotted line in FIG. 1. The base 18 is preferably no less than about 9 inches thick and formed of concrete. The finished surface 18a of the base 18 should be at existing ground level. The concrete is necessary to support and to make a sealable surface 18a to limit/eliminate bypass leakage for the flood barrier system 12. As illustrated in FIG. 4, the concrete structure of the base 18 is preferably further reinforced with rebars 19, known to the art, which may be laid in a crisscross pattern within the concrete base 18 prior to the concrete being poured. In addition, augured earth anchors 21, also known to the art, may be used for securing the concrete base 18 to the earth subgrade and preventing any movement of the base 18 during flooding conditions. Concrete anchors 24, illustrated in FIGS. 3, 4 and 5, used to bolt structures to the concrete surface 18a, are installed at extended lengths and at the corners of the base 18 for placement of the structural stands 16 on the base 18.

When the flood barrier system 12 is not deployed, the appearance of the base 18 is similar to or the same as a concrete sidewalk. It can be colored or natural looking concrete and can be used as a driveway, walkway, patio or landscape boarder. Low imprint "stamping" is also allowable for aesthetics.

Structural Stand 16:

Referring to FIGS. 3-6, the structural stand 16 is typically a light, aluminum structure capable of withstanding the static load of water to the desired design depth. While aluminum is the preferred composition for the structural stand 16, it is within the scope of the present invention to use other materials, such a steel, iron and other metals, wood and some plastics and polycarbonates, as long as the material has the strength and consistency to withstand the force and weight of flood waters.

The structural stand 16 is composed of a pair of base supports 30. The base supports 30 include a proximal end 30a and a distal end 30b. The base supports 30 are hingedly connected at proximal end 30a to a pair of upright sections 32 at hinges 34. The upright sections 32 include a proximal end 32a and a distal end 32b. A support leg 36, having a proximal end 36a and a distal end 36b, is hingedly attached to each of the uprights 32, approximately midway between ends 32a and 32b, at hinge 38. At the distal end 36b of each of the support legs 36 is a foot 40 designed to be fittingly engaged in any of a series of slots 42, which are part of the base supports 30. Preferably, the foot 40 is secured to a slot 42 by a pin 41 to prevent removal of the foot 40 from the slot 42 with resulting collapse of the structural stand 16 during periods of flooding. In this manner, the upright sections 32 of the structural stand 16 can be positioned at a 0° angle with respect to the base supports 30, i.e., collapsed adjacent the base supports 30 to a fully upright, preferred 85° angle, as illustrated in FIGS. 3 and 4.

A front facing shield 43 is attached by welding or the like to the front of each of the pair of uprights 32 to complete the structural stand unit 16. The shield 43 includes vertical pieces 44, 46 and horizontal pieces 48, 50, 52 connected to the uprights 32 in a framework to provide a backing for the liner 14. Cross supports 54 and 56 are secured by welding or the like to the proximal ends 30a and the distal ends 30b of the base supports 30 to connect the two elements of the structural stand 16 into a unit, as illustrated in FIG. 3.

Liner 14:

The liner 14 is typically a polyvinyl chloride ("PVC") or reinforced vinyl composite liner material for the flood barrier system 12. As illustrated in FIG. 1, the liner 14 has a leading edge 14a and a trailing edge 14b. As illustrated in FIG. 3, the liner material includes an outside layer 60 preferably of 20-30 mil PVC or reinforced vinyl composite material. If added resistance is required, the liner 14 can be backed by a second support backing 62. While any of number of flexible backings can be used, e.g., canvas, textile, etc., a preferred backing is made of geogrid material for additional strength and rigidity. The flood barrier system 12 can also be used with a reinforced polyvinyl layer 60 that will not require a separate geogrid support backing material.

Figure 5:
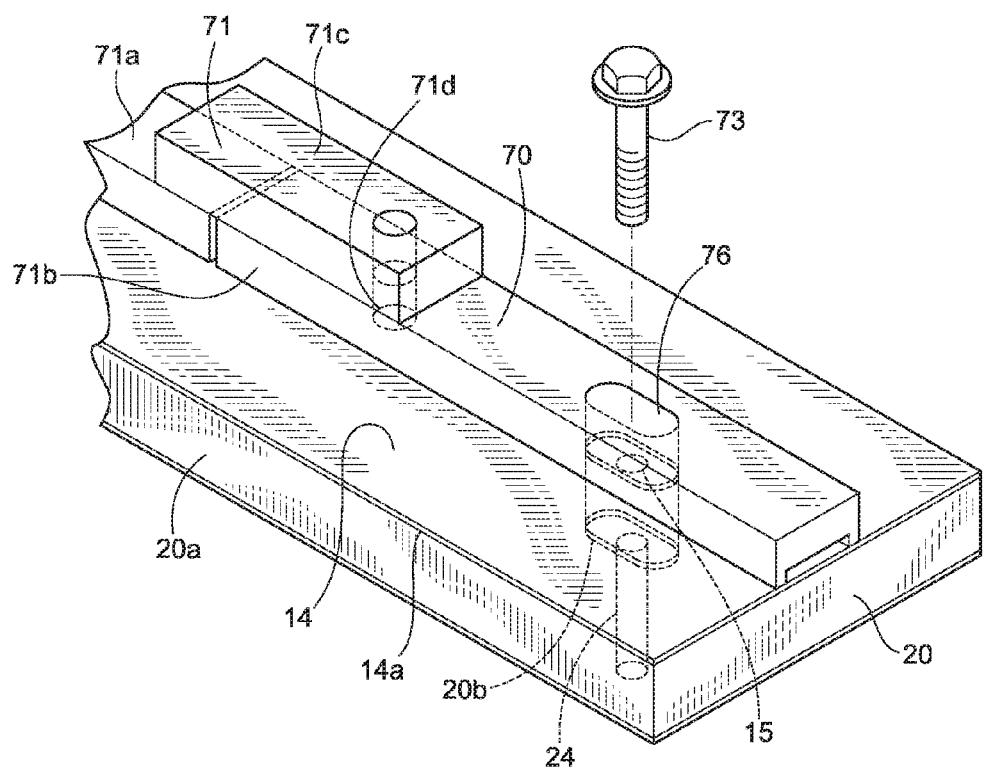
FIG. 5 is a perspective view of a detailed section (Detail A) from FIG. 3.
Figure 7:
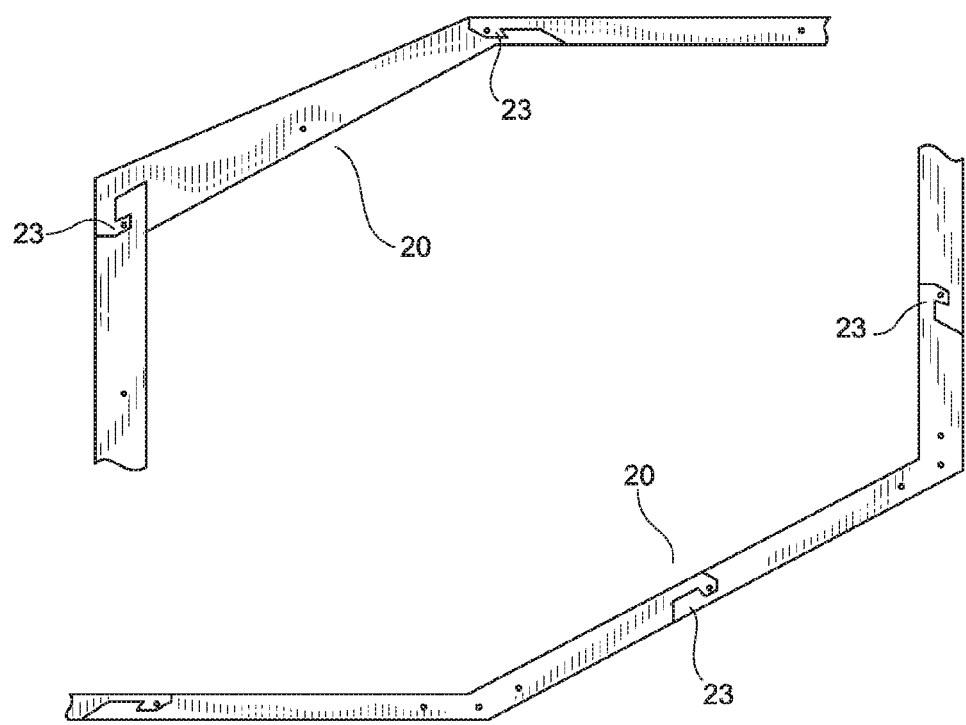
FIG. 7 is a partial top plan view of the base seal of the present invention.

Base Seal 20:

The base seal 20 serves as a seam between the liner 14 and structural concrete base 18. The base seal 20 can be made of rubber or other water impermeable substances and is attached to the base 20 via a base seal retainer bar—direct fastening system. As illustrated in FIGS. 3 and 5, the base seal 20 is an extended block preferably of recycled, vulcanized rubber material that extends along the perimeter of the base 18. As illustrated in FIG. 7, the base seal 20 can be formed of interlocking units 23 designed to extend around the base 18, including corners, etc.

Once the base seal 20 is placed in position on the surface 18a of base 18, one end of the liner sheet 14 is placed on top of the base seal 20, as illustrated in FIGS. 3 and 5, such that the end 14a of the liner 14 sheet is contiguous with the outer edge 20a of the base seal 20. A pressure equalizer bar 70, typically a straight steel or metal rod or a section with two 45° angles to achieve a 90° interior or exterior corner steel or metal rod, is then placed on the end of the surface edge of the liner 14 such that the liner 14 is sandwiched between the pressure equalizer bar 70 and the base seal 20, as illustrated best in FIG. 5. Depending on the length of the pressure equalizer bar 70, the bar 70 may include a connection piece 71 as shown in FIG. 5, consisting of a male end 71a and a female end 71b. The male end 71a includes an attachment tongue 71c welded or otherwise adhered to the upper surface of the male end 71a and extending over the end of the female end 71b. The attachment tongue 71c includes a downwardly depending post 71d that fits within an opening 71e extending downwardly from the surface of the female end 71b.

The retainer bar further include openings 76. The liner 14 also includes an opening 15, typically supported by a grommet, which coincides with the openings 76. Additionally, the base seal 20 will be provided with an opening 20b, designed to be situated over the anchors 24 placed at regular intervals along the base 18. Once the pressure equalizer bar 70 is placed over the openings, a securing mechanism such as a bolt 73 is then inserted through the openings in pressure equalizer bar, liner, base seal and secured into the prepositioned concrete anchors 24, predrilled and epoxied into the surface 18a of base 18. As illustrated in FIG. 3, securing bolts 73 are placed at regular intervals on the base seal 20 to seal the liner 14 to the base 18 through the barrier flood system 12.

Figure 6:
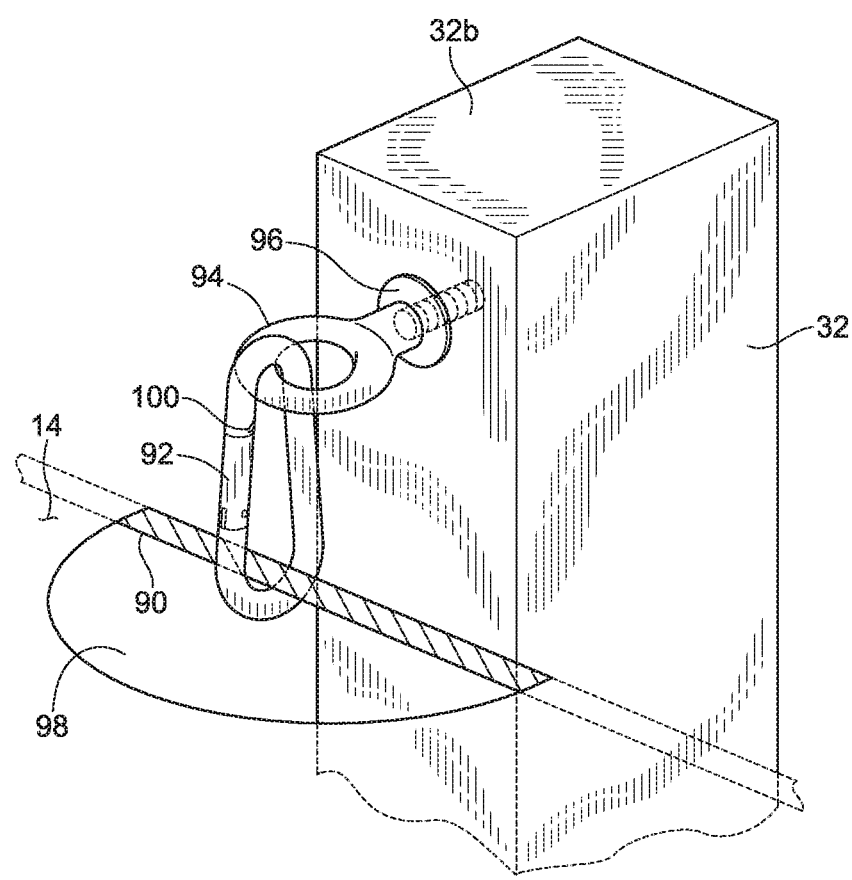
FIG. 6 is a perspective view of a detailed section (Detail B) from FIG. 4.

As illustrated in FIGS. 3 and 6, the distal ends 32b of each of the upright sections 32 throughout the flood barrier system 12 include suspension cable retainer system for suspending a barrier suspension cable 90. The suspension cable retainer system includes a suspension cable retainer 92 secured to an eyebolt 94 with a solid fastener, which is secured to the proximal end 32a of the upright sections 32 by threaded screw or the like. A washer 96 assists in the securing operation. As illustrated in FIG. 6, the top end of the liner 14 is then secured to the suspension cable 90 by sewing, adhesion or the like. An opening 98 is provided to expose the cable 90 for attachment to the suspension cable retainer. As illustrated, the suspension cable retainer 92 includes a spring operated locking element 100 for receiving the cable 90.

In this manner, the liner 14 can be secured at both vertical edges (top & bottom) to the base seal 20 and the proximal ends 32*a* of the structural stand uprights 32.

Figure 8:
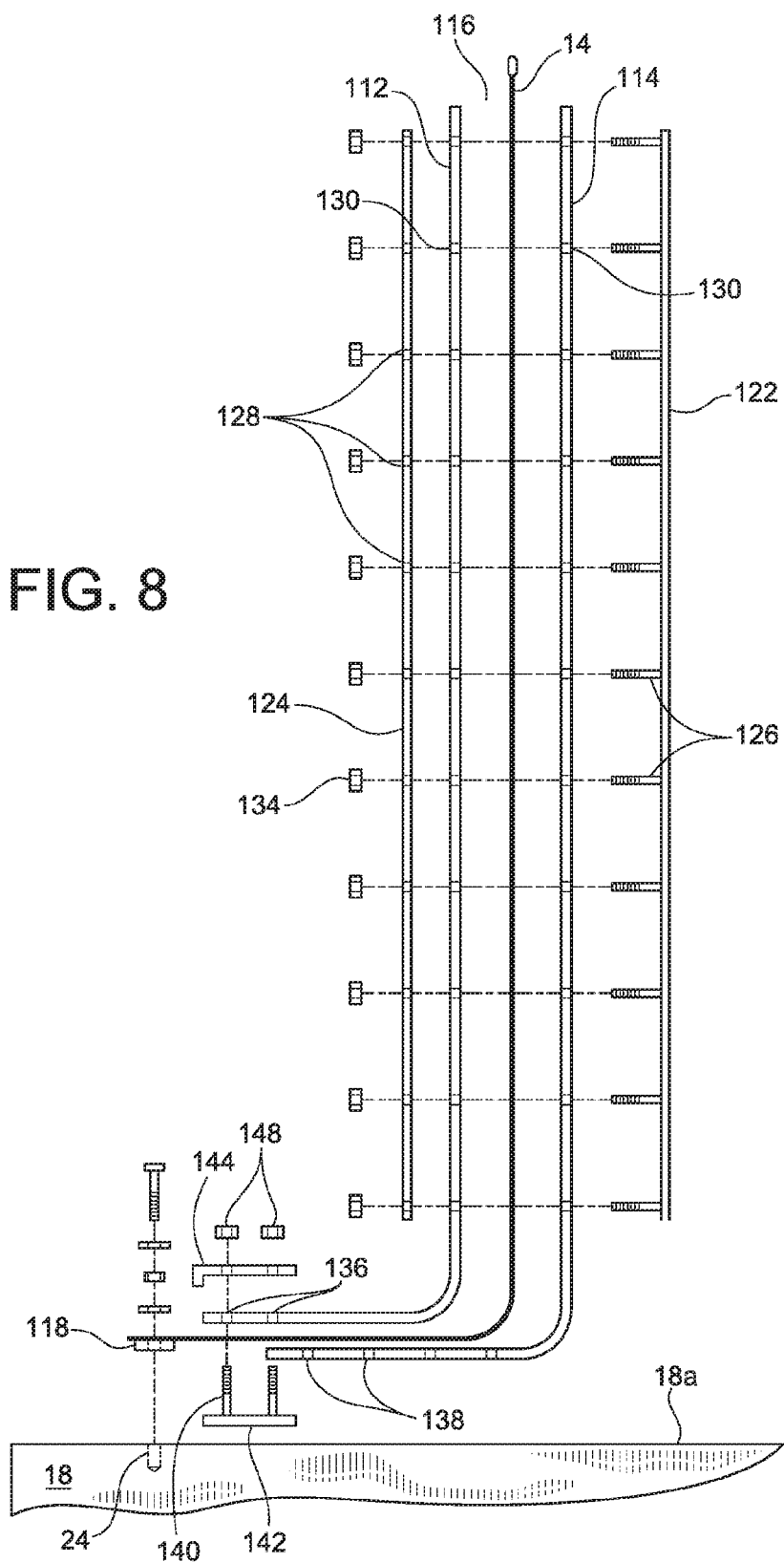
FIG. 8 is an exploded side plan view of the vertical liner seal of the present invention.
Figure 9:
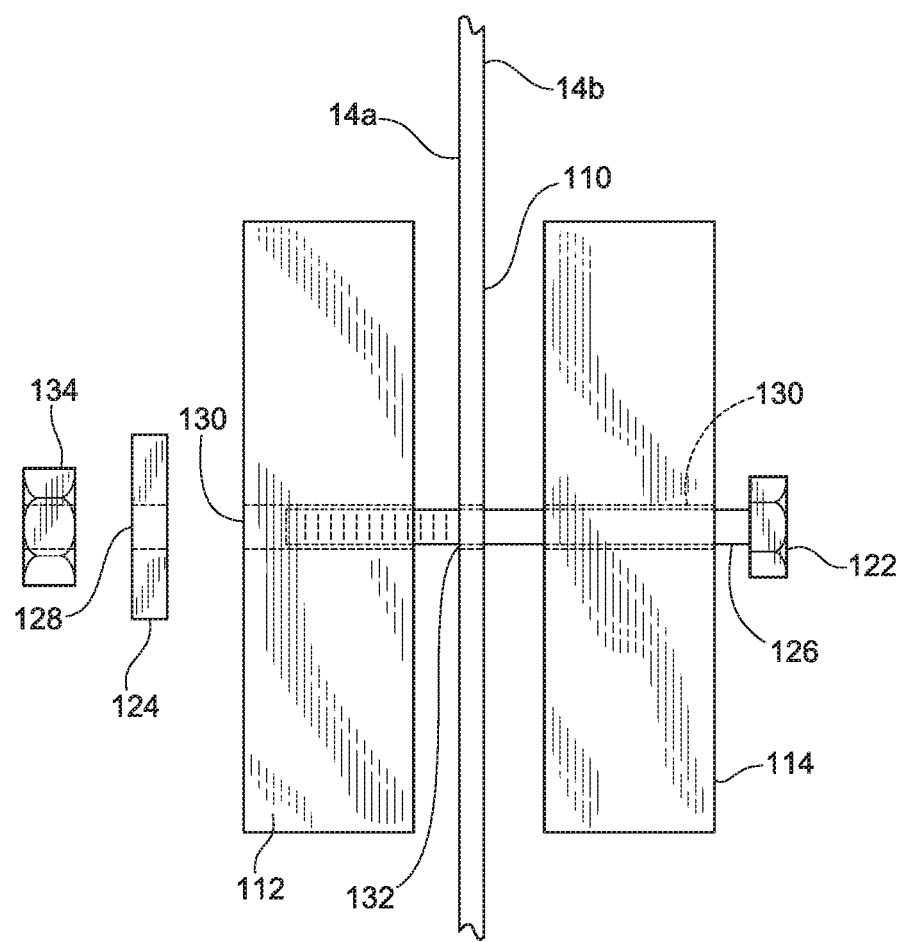
FIG. 9 is an exploded top plan view of the vertical liner seal of FIG. 8.

Vertical Liner Seal 22:

Referring to FIG. 1, the vertical liner seal 22 creates a waterproof barrier at all vertical seams 22 where the leading edge 14*a* and the trailing edge 14*b* of the liner 14 meet within the flood barrier system 12. While a number of seals can be contemplated, the following is a preferred seal for the present invention. The vertical liner seal 22 can be made of vulcanized rubber and is attached to the system using a double retainer bar, bolt/washer/nut configuration as illustrated in FIGS. 8 and 9. Edges 14*a* and 14*b* of liner 14 overlap at a juncture point 110 of the seal 22 and are sandwiched together by an inner strip 112 and an outer strip 114 of flexible, strong, liquid impervious material. While materials are known to the industry for providing these qualities, a preferred material is a strip of flexible, vulcanized rubber approximately 4-6 inches wide and extending from the upper border 116 of the barrier system 12 to the sealing foot 118 at the location of the base 18. The strips 112, 114 are secured to the overlapping edges 14*a* and 14*b* of the liner 14 by a vertical seal pressure connector system 120 including a male section 122 and a female section 124. As illustrated, the male section 122 includes a series of regularly spaced threaded extensions 126 extending at a ninety-degree angle from the male section 122. The female section 124 includes a corresponding series of openings 128 to receive the threaded end of the extensions 126. To complete the connection of the seal 22, corresponding openings 130 are provided in the strips 112, 114, and corresponding openings 132 are provided in overlapped area of the liner 14, all of which allow the threaded extensions 126 of the male section 122 to penetrate through the juncture point 110 at which point the female section 124 can be connected to the male section 122 by placing the openings 128 over the extensions 126. The connection is completed by means of a series of threaded nuts 134 connected to each of the threaded extensions 126.

Figure 10:
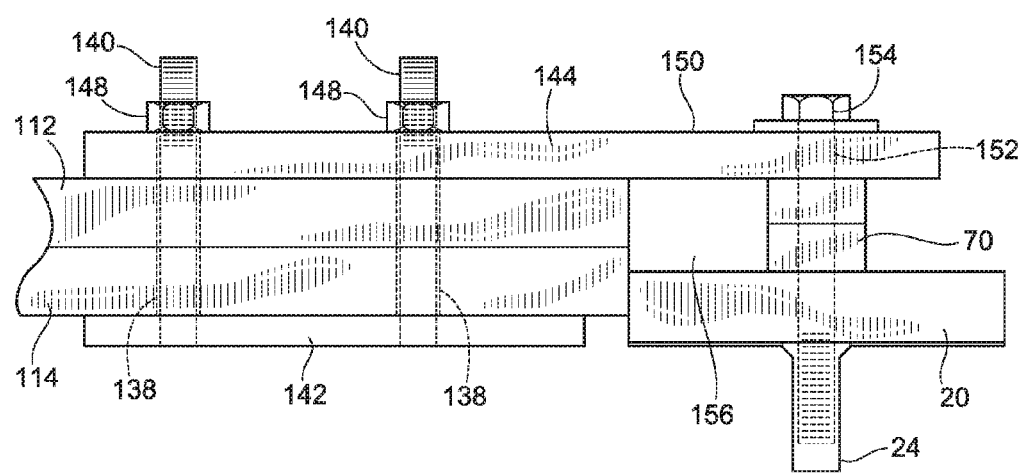
FIG. 10 is a side plan view of vertical seal liner base connector as illustrated in FIG. 8.

As illustrated in FIGS. 8 and 10, both the inner and outer strips 112 and 114 fold along the surface 18*a* of the base 18 for attachment to the base 18 by means of anchor 24. Each strip 112 and 114 includes a pair of openings 136, 138, which are designed to fit upon the threaded extensions 140 of a male vertical seal base pressure connector 142. Once the strips 112, 114 are fitted onto the male vertical seal base pressure connector 142, a female vertical seal base pressure connector 144 with corresponding openings 146 to the threaded extensions 140 is fitted onto the male vertical seal base pressure connector 142. The connection is secured by means of a pair of threaded nuts 148 connected to the threaded extensions 140.

As illustrated best in FIG. 10, the attachment of the vertical liner seal 22 to the base 18 is first provided by an extension piece 150 connected to the female base pressure connector 114. The extension piece 150 is provided with an opening 152 for receiving a threaded bolt 154, which will be threadably attached to the anchor 24. As illustrated in FIG. 10, the bolt 154 first passes through the opening 152. A pressure connector block 154 of water impermeable material is then placed between the extension piece 150 and the pressure equalizer bar 70 to sealingly fit the pieces together. The extension piece 150 further includes a downwardly extending support block 156 to seal any further openings between the extension piece 150 and the vertical strips 112, 114.

Method of Constructing Flood Barrier System

Site Preparation for Flood Barrier System 12

To prepare the flood barrier system 12, plants, grasses, topsoil and humus bearing materials should first be stripped from the area where the base foundation 18 is intended to be poured. Topsoil can be stockpiled for placement around the finished structural foundation 18. Elevations shall be shot and recorded, making sure that slopes do not exceed 3% along the run of the proposed base foundation 18. Any necessary fills should be made with a cohesive, clay material, not silts, sands, gravel or other deleterious material. It is not recommended to use gravel or sand as a subbase for the proposed base foundation 18. Concrete should be placed on the mechanically compacted, existing sub grade material. The subgrade should be established 9-inches below the finished grade of the proposed concrete slab/sidewalk/concrete ring.

Installation of Reinforced Structural Slab Anchors 24

Once the location of the base foundation 18 has been established, earth anchors 21 are drilled in base 18 at each corner (interior and exterior) and at the midpoint of any straight section exceeding 20 lineal feet; then at a frequency not exceeding 20 lineal feet for the remainder of the length of the straight section. The earth anchors 21 are preferably installed 1 foot from the outside edge of the proposed slab at a 10-degree positive angle from vertical.

Installation of Steel Reinforced Structural Concrete Slab

Two layers of #4 steel rebar 19, spaced at a frequency of 2 foot on center are preferably placed; one at a level of +3-inches above the sub grade and another at an elevation of +6-inches above the established sub grade elevation. This places the top layer of rebar 19 at an elevation 3 inches below the finished surface 18*a* of the base 18. Once the first layer of rebar 19 is placed, the earth anchors 21 are connected to this rebar 19 layer with stainless or galvanized fasteners. A second layer of steel rebar 19 is then tied to anchor system throughout. Concrete is poured into forms surrounding the building structure and allowed to set. Openings for the concrete anchors 24 are located and drilled in the surface 18*a* of the base 18 for placement of the anchors 24 and eventual placement of the structural stands 16. Concrete anchors 24, with epoxy, are installed in the openings in the base foundation 18. The finished concrete slab is then sealed with a quality sealant. The thickness of the finished slab shall be no less than that necessary to support the system under full design floodwater load.

The inside edge of the base 18 preferably shall be no closer to the protected area/structure 10 than 1 foot. While the required width and length of the base 18 is mandatory, the concrete can be poured outside these parameters to create whatever ornamental landscaping design the owner requests.

Deployment of the Base Seals 20

The base seals 20 are formed in three structures: (1) straight sections, (2) interior corner sections, and (3) exterior corner sections. The base seals 20 are placed on the base foundation 18 and anchored as described above. The base seals 20 are positioned approximately 1 foot in from the outside edge of the base 18. As illustrated in FIG. 7, the base seal segments fasten together with the pre-formed tabs at 23, similar to a puzzle piece. The base seals 20 are then fastened together by inserting screws, to securely lock the individual base seal pieces together. Referring particularly to FIG. 5, the base seals 20 and liner system 14 are fastened to the base 18, with the pressure equalizer bar 70 using the anchor 24.

The pattern of anchor openings in the base foundation 18 is established and drilled after the initial installation of the base foundation 18.

Deployment of the Liner System

The liner system 14 is positioned around the base foundation by means of a vehicle, such as a riding lawnmower or an ATV (not illustrated). Referring to FIG. 5, the liner 14 is adhered to the rubberized base seal 20 by a pressure equalizer bar 70, using the bolt/washer/drop anchor system described above. The liner 14 includes same-material reinforcement grommets 78, which are used to seat the liner 14 to the vulcanized rubber base seal 20 and the base foundation 18; using the base seal retainer bar 70 and the bolt/washer/concrete drop anchor system. The Base Seal System 20 is then "snugged" down, with the exception of the area(s) directly adjacent to the vertical liner seal 22. At this point, the liner 14 is loosely draped on the ground.

Deployment of the Structural Stands

Each upright of the structural stands 16 is placed over pre-drilled holes on the base foundation 18. The structural stands 16 are preferably placed at 8-foot increments and at all corners of the base foundation 18. Since the base foundation 18 can act like a sidewalk around the protected building area 10, no depressions are necessary with the system. Just like the base seals 20, the structural stands 16 have anchor holes 24 pre-drilled into the base foundation 18. When deployment occurs, the bolt/washer/concrete drop anchor systems are used to fasten the stands to the base foundation 18.

Installation of the Liner 14

The distal or outer edge of the liner 14 is connected to the structural stands 16 such that a suspension cable 90 connected to the liner 14 passes through a suspension cable retainer 92 as illustrated in FIG. 6 at the distal end 32b of the upright section 32 of the structural stand 16. The system is then tightened, using both the structural stand 16, deployed to its final position, such that the liner 14 has a relatively snug fit against each of the structural stands 16, thereby creating the barrier system.

Connecting and Sealing the Liner Ends

Once the liner 14 has been completely deployed, i.e., laid out around the protected area and fastened to the base foundation 18, the leading edge 14a and trailing edge 14b of the liner must be connected and sealed. This is accomplished using a combination, bolt/washer/washer/nut, system, along with a vulcanized rubber/retainer bar/liner base pressure connector system. The vertical liner seal 20 is then completed as describe above.

Attachment of Liner Cable to Stand Karabiners and Erect Structural Stands

With the structural stands 16 in a horizontal position, liner support cable 90 is looped through all of the suspension cable retainers 92 on the structural stands 16. The structural stands 16 are then erected to the "deployed" position. At this point, the structural stands 16 are in the deployed position, with the liner 14 hanging from the cable 90, which is attached to the cable retainer 92 and the vertical seals 22 in place and locked down.

Firmly Tighten all Bolts to Required Torque

The flood barrier system 12 relies on having all fastening hardware tightened to specific levels to assure sealing of all components. Appropriate torque is applied to all bolts previously installed in the flood barrier system 12. Preferably, bolts are tightened and marked with a paint stick to assure that appropriate forces have been applied.

Any version of any component or method step of the invention may be used with any other component or method step of the invention. The elements described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated references, the present disclosure controls.

The devices, methods, compounds and compositions of the present invention can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. It is to be understood that this invention is not limited to the particular examples, process steps, and materials disclosed herein as such process steps and materials may vary somewhat. It is also understood that the terminology used herein is used for the purpose of describing particular embodiments only and is not intended to be limiting since the scope of the present invention will be limited to only the appended claims and equivalents thereof.

What is claimed is:

1. A protective flood barrier to protect a building or utility installation from flood waters, comprising:
   a. a continuous, water-tight base foundation surrounding and positioned in close proximity of the building or utility installation, wherein the base foundation comprises an upper planar surface at existing ground level;
   b. a plurality of removable structural stands adapted for placement on the base foundation wherein the structural stands have a proximal end situated adjacent the base foundation and a distal end and wherein the structural stands are disconnected from each other and spaced apart with respect to each other forming gaps therebetween, wherein the plurality of removable structural stands are attached to the upper planar surface at the existing ground level;
   c. a flexible sealing liner for placement on the plurality of structural stands wherein the flexible sealing liner spans the plurality of structural stands and gaps therebetween, thereby positioning portions of the flexible sealing liner at the gaps without rigid backing; and
   d. a base seal for sealing the sealing liner to the base foundation, wherein the base foundation includes anchors installed in the base foundation for anchoring the base seal to the base foundation.

2. The protective flood barrier of claim 1 wherein the base foundation comprises reinforced, anchored concrete.

3. The protective flood barrier of claim 2 wherein the base foundation is at least nine inches thick.

4. The protective flood barrier of claim 1 wherein the base foundation is situated approximately one foot from the building.

5. The protective flood barrier of claim 1 wherein the liner is a PVC liner.

6. The protective flood barrier of claim 1 wherein the liner comprises reinforced vinyl composite liner material.

7. The protective flood barrier of claim 6 wherein the liner material includes an outside layer of 20-30 mil PVC or reinforced vinyl composite material, backed by a support backing of geogrid material.

8. The protective flood barrier of claim 1 wherein the base seal comprises interlocking units of recycled, vulcanized rubber.

9. The protective flood barrier of claim 8 wherein the base seal further comprises a straight base seal section, an interior corner base seal section, and an exterior corner base seal section.

10. The protective flood barrier of claim 1 further comprising a base seal retainer bar for sealing the liner to the base foundation.

11. The protective flood barrier of claim 1 wherein the sealing liner comprising at least one vertical connecting seam and the sealing liner further comprises a vertical liner seal for forming a water proof barrier at all vertical seams within the flood barrier system.

12. The protective flood barrier of claim 11 wherein the vertical liner seal comprises vulcanized rubber.

13. The protective flood barrier of claim 1 wherein the plurality of structural stands are positioned at regular intervals along the base foundation.

14. The protective flood barrier of claim 13 wherein the plurality of structural stands are positioned at approximately 8-foot intervals along the base foundation.

15. The protective flood barrier of claim 1 wherein the base foundation includes openings for securing the plurality of structural stands.

16. The protective flood barrier of claim 1 further comprising a cable attached to and connecting the distal ends of the plurality of structural stands for attaching the liner to the structural stand such that the liner is vertically suspended along the plurality of structural stands around the base foundation.

17. A method of providing a flood barrier system to protect a building from flood waters, comprising:
 a. providing a continuous, water-tight base foundation surrounding and positioned in close proximity of the building, wherein the base foundation comprises an upper planar surface at existing ground level, wherein the base foundation includes anchors installed in the base foundation;
 b. attaching a plurality of removable structural stands to the upper planar surface of the base foundation at the existing ground level, wherein the structural stands have a proximal end situated adjacent the base foundation and a distal end, wherein the plurality of structural stands further have an exterior side and an interior side and wherein the structural stands are disconnected from each other and spaced apart with respect to each other forming gaps therebetween;
 c. wrapping a flexible sealing liner around the exterior side of the plurality of structural stands, wherein the flexible sealing liner spans the plurality of structural stands and gaps therebetween, thereby positioning portions of the flexible sealing liner at the gaps without rigid backing, wherein the flexible sealing liners has two ends which meet; and
 d. placing a base seal over the two ends of the flexible sealing liner for sealing the sealing liner to the base foundation wherein the base seal is anchored to the base foundation by the anchors.

* * * * *